United States Patent
Ke et al.

(10) Patent No.: US 12,531,639 B2
(45) Date of Patent: Jan. 20, 2026

(54) OPTICAL TRANSMISSION CONTROL DEVICE

(71) Applicant: Global Technology Inc., Ningbo (CN)

(72) Inventors: Weikang Ke, Ningbo (CN); Fan Yang, Ningbo (CN); Qikun Huang, Ningbo (CN)

(73) Assignee: Global Technology Inc., Ningbo (CN)

( * ) Notice: Subject to any disclaimer, the term of this patent is extended or adjusted under 35 U.S.C. 154(b) by 556 days.

(21) Appl. No.: 18/122,952

(22) Filed: Mar. 17, 2023

(65) Prior Publication Data

US 2024/0137126 A1 Apr. 25, 2024
US 2024/0235688 A9 Jul. 11, 2024

(30) Foreign Application Priority Data

Oct. 19, 2022 (CN) .......................... 202211278035.2

(51) Int. Cl.
*H04B 10/50* (2013.01)
*H04B 10/60* (2013.01)
(52) U.S. Cl.
CPC ........... *H04B 10/503* (2013.01); *H04B 10/60* (2013.01)
(58) Field of Classification Search
CPC ............................... H04B 10/503; H04B 10/60
See application file for complete search history.

(56) References Cited

U.S. PATENT DOCUMENTS

| | | | |
|---|---|---|---|
| 2013/0156417 A1* | 6/2013 | Chou | H04B 10/40 398/5 |
| 2016/0248534 A1* | 8/2016 | Kuang | H04B 10/503 |
| 2017/0012701 A1* | 1/2017 | Yao | H04B 10/503 |
| 2023/0050177 A1* | 2/2023 | Grieder | H01S 5/02251 |

* cited by examiner

*Primary Examiner* — Pranesh K Barua
(74) *Attorney, Agent, or Firm* — Grossman Tucker Perreault & Pfleger, PLLC

(57) ABSTRACT

An optical transmission control device comprises a first/second light emitting sub-component, a first/second signal transmission line, a laser driving component, and a microcontroller. The first signal transmission line is connected to the first light emitting sub-component and configured to receive analog signal. The second signal transmission line is configured to receive digital signal. The laser driving component is connected to the first light emitting sub-component, the second light emitting sub-component, and the second signal transmission line. The microcontroller is connected to the laser driving component and configured to receive a data signal. The microcontroller is configured to control the laser driving component to generate and output the driving signal to at least one of the first/second light emitting sub-component according to the data signal and control the laser driving component to process and output the digital signal to the second light emitting sub-component according to the data signal.

8 Claims, 3 Drawing Sheets

OPTICAL TRANSMISSION CONTROL DEVICE

CROSS-REFERENCE TO RELATED APPLICATIONS

This non-provisional application claims priority under 35 U.S.C. § 119(a) on Patent Application No(s). 202211278035.2 filed in China on Oct. 19, 2022, the entire contents of which are hereby incorporated by reference.

BACKGROUND

1. Technical Field

This disclosure relates to the technical field of optical communication, especially to an optical transmission control device.

2. Related Art

With the internet developing rapidly, new applications of the internet prospering, and the amount of data transmitted increasing day by day, requirements over the internet become more and more demanding. With the current development of internet communication, the capacity of the internet may no longer be able to support the rising growth of future network traffic. Therefore, to solve the described issues, an optimized and improved configuration of the transmission device and simplification over the complexity of the internet are needed.

SUMMARY

Accordingly, this disclosure provides an optical transmission control device with integrated transmission channels of digital signal and analog signal to transmit the digital signal and the analog signal simultaneously.

According to one or more embodiments of this disclosure, an optical transmission control device comprises a first light emitting sub-component, a second light emitting sub-component, a first signal transmission line, a second signal transmission line, a laser driving component, and a microcontroller. The first signal transmission line is connected to the first light emitting sub-component and configured to receive an analog signal. The second signal transmission line is configured to receive a digital signal. The laser driving component is connected to the first light emitting sub-component, the second light emitting sub-component, and the second signal transmission line. The microcontroller is connected to the laser driving component and configured to receive a data signal. The microcontroller is configured to control the laser driving component to generate and output a driving signal to at least one of the first light emitting sub-component and the second light emitting sub-component according to the data signal and control the laser driving component to process and output the digital signal to the second light emitting sub-component according to the data signal.

According to one or more embodiments of this disclosure, an optical transmission control device comprises a first light receiving sub-component, a second light receiving sub-component, a first signal transmission line, a second signal transmission line, and a microcontroller. The first light receiving sub-component is configured to receive an analog signal. The second light receiving sub-component is configured to receive a digital signal. The microcontroller is connected to the first light receiving sub-component and the second light receiving sub-component. The first signal transmission line is connected to the first light receiving sub-component and configured to output the analog signal. The second signal transmission line is connected to the second light receiving sub-component and configured to output the digital signal.

In view of the above description, the optical transmission control device of the present disclosure may transmit the digital signal and the analog signal simultaneously with integrated transmission channels of digital signal and analog signal, thereby providing an optical transmission control device with low power consumption, small size, and simple organization.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

It should be understood that, the terms "first", "second", etc. used herein may describe various elements, components, regions, layers and/or sections, and these elements, components, regions, layers and and/or sections should not be limited by these terms. These terms are only used to distinguish one element, component, region, layer and/or section from another element, component, region, layer and/or section.

Additionally, the term "comprising" refers to the presence of stated features, regions, integers, steps, operations, elements and/or components, but does not exclude one or more other features, regions, integers, steps, operations, elements, components and/or the presence or addition of a combination thereof.

Figure 1:
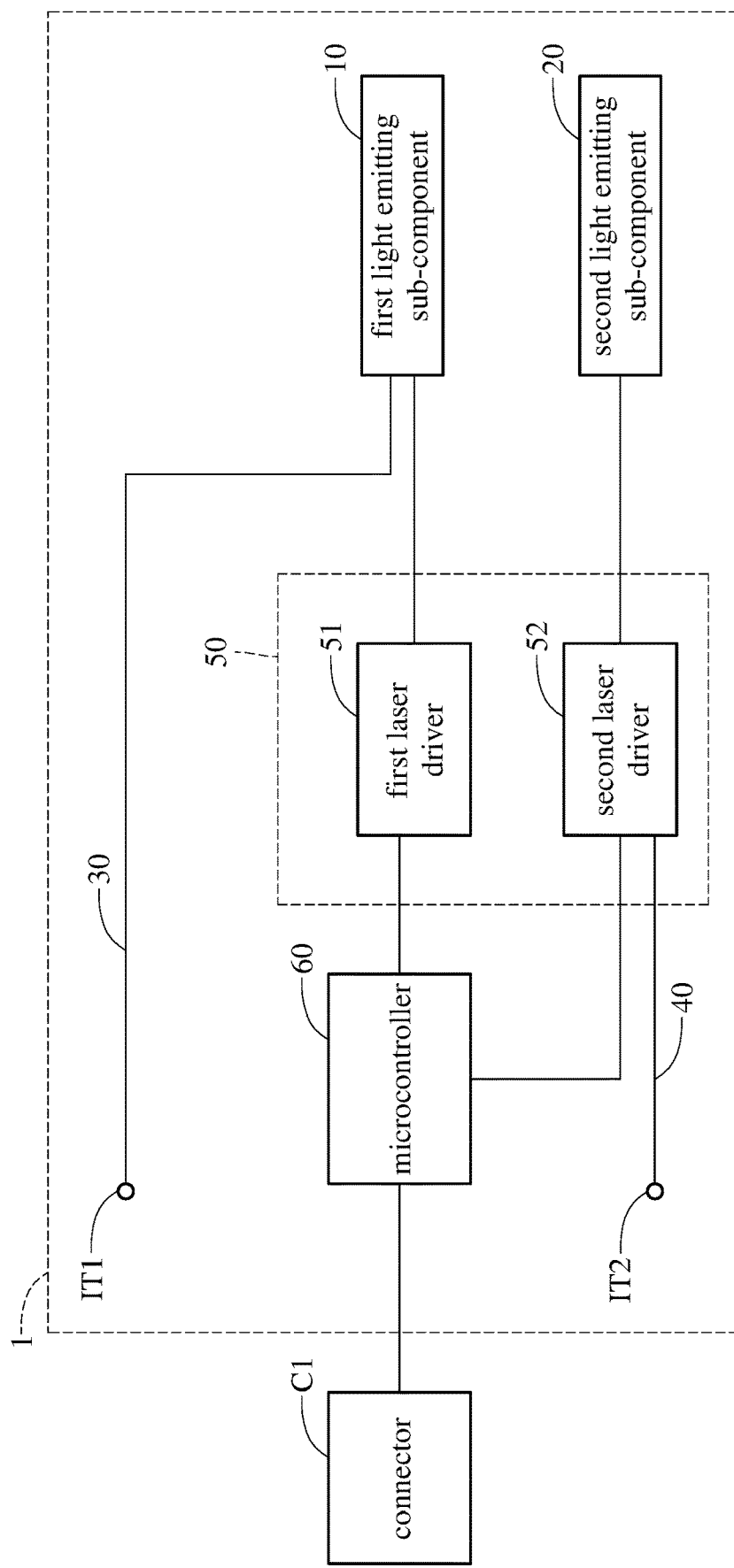
FIG. 1 is a functional block diagram of an optical transmission control device according to an embodiment of the present disclosure.

Please refer to FIG. 1 which is a functional block diagram of an optical transmission control device according to an embodiment of the present disclosure. An optical transmission control device 1 comprises a first light emitting sub-component 10, a second light emitting sub-component 20, a first signal transmission line 30, a second signal transmission line 40, a laser driving component 50, and a microcontroller 60. The first signal transmission line 30 is electrically connected to the first light emitting sub-component 10 and configured to receive an analog signal. The second signal transmission line 40 is configured to receive a digital signal. The laser driving component 50 is electrically connected to the first light emitting sub-component 10, the second light emitting sub-component 20, and the second signal transmission line 40. The microcontroller 60 is electrically connected to the laser driving component 50 and configured to receive a data signal through a connector C1. The microcontroller 60 is configured to control the laser driving component 50 to generate and output a driving signal to at least one of the first light emitting sub-component 10 and the second light emitting sub-component 20 according to the data signal, and control the laser driving component 50 to process and output the digital signal to the second light emitting sub-component 20 according to the data signal.

In the present embodiment, the first light emitting sub-component 10 and the second light emitting sub-component 20 may each be implemented through a transmitter optical subassembly (TOSA), and may each include a wavelength division multiplexing (WDM), photodetector (PD), optical modulator, optical splitter, modulator driving component, and trans-impedance amplifier, among others. The first signal transmission line may have a signal input terminal IT1 and a signal output terminal. The second signal transmission line 40 may have a signal input terminal IT2 and a signal output terminal. The signal input terminal IT1 of the first signal transmission line 30 is configured to receive an analog signal, which may be, for example, a radio-frequency signal. The signal output terminal of the first signal transmission line 40 is connected to the first light emitting sub-component 10. The signal input terminal IT2 of the second signal transmission line 40 is configured to receive a digital signal, which may be, for example, a digital signal of 2.5 Gbps. The signal output terminal of the second signal transmission line 40 is electrically connected to the laser driving component 50. Furthermore, the input terminal IT1 may receive the analog signal from, for instance, an antenna array, through the connector, and the input terminal IT2 may receive the digital signal from, for instance, the antenna array as well, through the connector.

In the present embodiment, the laser driving component 50 may include a first laser driver 51 and a second laser driver 52. The first laser driver 51 is electrically connected to the microcontroller 60 and the first light emitting sub-component 10, so that the microcontroller 60 could control the first laser driver 51 to generate and output the driving signal to the first light emitting sub-component 10. The second laser driver 52 is electrically connected to the second signal transmission line 40, the microcontroller 60, and therefore the microcontroller 60 could control the second laser driver 52 to generate and output the driving signal to the second light emitting sub-component 20. The second laser driver 52 might also receive the digital signal and process the same when controlled by the microcontroller 60. In one implementation, the first laser driver 51 and the second laser driver 52 are independently disposed. In another implementation, the first laser driver 51 and the second laser driver 52 may be integrated into one laser driver.

Specifically, the microcontroller 60 can receive the data signal of the system module (e.g., the whole system module) through the connector C1. The optical transmission control device 1 might be integrated as a part of the system discussed here. The data signal includes at least one of an analog command and a digital command. When the data signal includes the analog command, the microcontroller 60 controls the first laser driver 51 to output the driving signal to the first light emitting sub-component 10 according to the analog command. When the data signal includes the digital command, the microcontroller 60 controls the second laser driver 52 to generate and output the driving signal to the second light emitting sub-component 20 and controls the second laser driver 52 to process and output the digital signal to the second light emitting sub-component 20 according to the digital command. When the data signal includes both the analog command and the digital command, the microcontroller 60 controls the first laser driver 51 to generate and output the driving signal to the first light emitting sub-component 10 and controls the second laser driver 52 to generate and output the driving signal to the second light emitting sub-component 20, and controls the second laser driver 52 to process and output the digital signal to the second light emitting sub-component 20.

In the present embodiment, the first light emitting sub-component 10, the second light emitting sub-component 20, the microcontroller 60, the first laser driver 51, and the second laser driver 52 of the optical transmission control device 1 may be electrically connected to an external power supply, a battery or other power supplying terminal through connectors respectively, to receive power (of 3.3V, for instance).

In view of the above description, the present disclosure provides an optical transmission control device of low-power consumption and small size, which is capable of transmitting the digital signal and the analog signal simultaneously.

Figure 2:
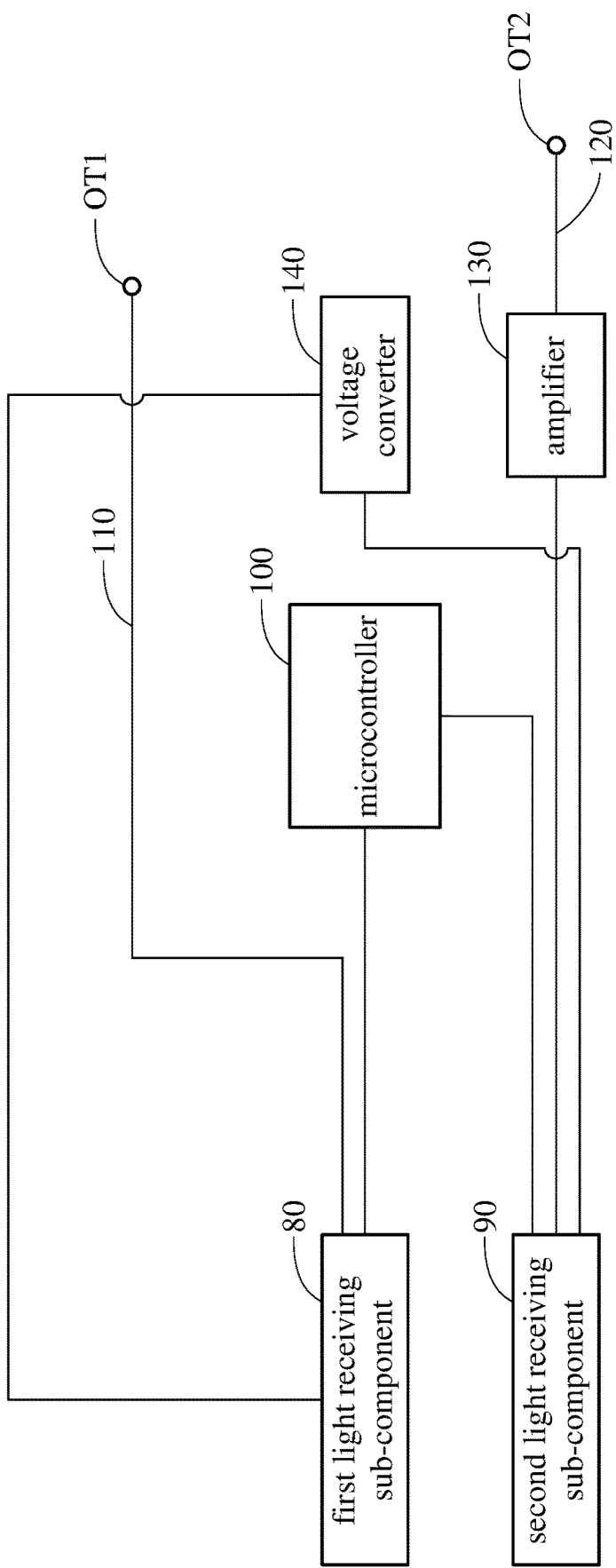
FIG. 2 is a functional block diagram of an optical transmission control device according to another embodiment of the present disclosure.

Please refer to FIG. 2 which is a functional block diagram of an optical transmission control device according to another embodiment of the present disclosure. As shown in FIG. 2, the optical transmission control device 2 includes a first light receiving sub-component 80, a second light receiving sub-component 90, a microcontroller 100, a first signal transmission line 110, and a second signal transmission line 120. The first light receiving sub-component 80 and the second light receiving sub-component 90 may each be implemented by a receiver optical subassembly (ROSA), which can include wavelength division multiplexing (WDM), photodetector (PD), optical modulator, optical splitter, modulator driving component, trans-impedance amplifier among others. The first light receiving sub-component 80 is configured to receive an analog signal. The second light receiving sub-component 90 is configured to receive a digital signal. The microcontroller 100 is electrically connected to the first light receiving sub-component 80 and the second light receiving sub-component 90 to detect whether light receiving functions of the first light receiving sub-component 80 and the second light receiving sub-component 90 are normal. The first signal transmission line 110 is electrically connected to the first light receiving sub-component 80 and configured to output the analog signal. The second signal transmission line 120 is electrically connected to the second light receiving sub-component 90 and configured to output the digital signal.

In the present embodiment, the first signal transmission line 110 may have a signal input terminal and a signal output terminal OT1, and the second signal transmission line 120 may have a signal input terminal and a signal output terminal OT2. The signal input terminal of the first signal transmission line 110 is electrically connected to the first light receiving sub-component 80, and the signal output terminal OT1 of the first signal transmission line 110 outputs the analog signal. The signal input terminal of the second signal transmission line 120 is electrically connected to the second light receiving sub-component 90, and the output terminal OT2 of the second signal transmission line 120 outputs the digital signal.

In the present embodiment, an amplifier 130 and a voltage converter 140 may be further included. One end of the amplifier 130 is electrically connected to the second light receiving sub-component 90 and another end of the amplifier 130 is connected to the signal input terminal of the second signal transmission line 120, and the amplifier 130 may amplify the digital signal, which is then outputted from the output terminal OT2 of the second signal transmission line 120. In one implementation, the amplifier 130 can be a linear amplifier. The voltage converter 140 is electrically connected to the first light receiving sub-component 80 and the second light receiving sub-component 90, receives power (of 3.3 V, for instance) from a power supply (for example, connected to an external power supply, a battery or other power supplying terminal through the connector), and converts the received power before supplying it to the first light receiving sub-component 80 and the second light receiving sub-component 90. In one implementation, the voltage converter 140 may be a DC-DC converter. It should be noted that, the first light receiving sub-component 80 and the second light receiving sub-component 90 can be directly connected to the power supply without the voltage converter 140, which is an element optionally disposed. In addition, the microcontroller 100 and the amplifier 130 may be connected to an external power supply to receive power (for instance, 3.3 V).

It should be noted that, the optical transmission control device of one or more of embodiment of the present disclosure may be implemented as a radio over fiber (ROF) module, and may be applied to on-tower (outdoor) and/or under-tower (indoor) optical module array. Compared to a general ROF module, when performing transmission tasks using the analog signal transmission channel, the optical transmission control device of the embodiment of the present disclosure integrates the analog signal transmission channel with the digital signal transmission channel, and therefore monitoring control and system upgrade may be performed offsite simultaneously. Compared to a conventional optical module, the optical transmission control device of the embodiment of the present disclosure integrates the analog signal transmission channel and the digital signal transmission channel to reduce size of the product, the power consumption, and the complexity of network configuration.

Figure 3:
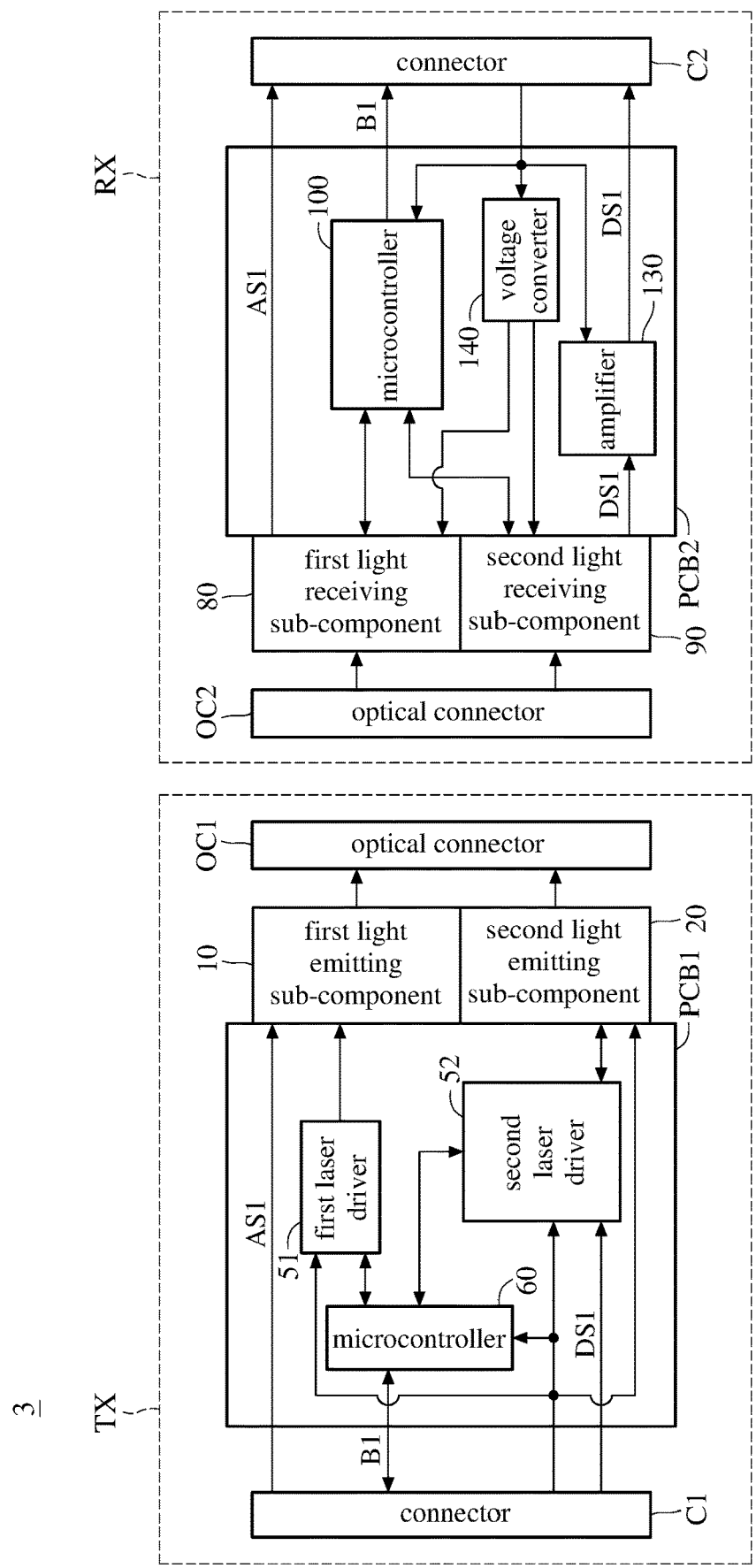
FIG. 3 is a functional block diagram of an optical transmission control device according to still another embodiment of the present disclosure.

Please refer to FIG. 3, which is a functional block diagram of an optical transmission control device according to still another embodiment of the present disclosure. As shown in FIG. 3, the optical transmission control device 3 includes a light emitting control circuit located at a transmission terminal TX and a light receiving control circuit located at a receiving terminal RX.

The light emitting control circuit includes a first light emitting sub-component 10, a second light emitting sub-component 20, a first laser driver 51, a second laser driver 52, a microcontroller 60, a connector C1, and an optical connector OC1. The light emitting sub-component 10, the second light emitting sub-component 20, the first laser driver 51, the second laser driver 52, and the microcontroller 60 might be disposed on a printed circuit board PCB1. The configuration and function of the light emitting sub-component 10, the second light emitting sub-component 20, the first laser driver 51, the second laser driver 52, and the microcontroller 60 could be similar to the embodiment illustrated in FIG. 1 in terms of functionality. The connector C1 is electrically connected to the first signal transmission line 30 and the second signal transmission line 40 illustrated in FIG. 1. As such, the analog signal AS1 and the digital signal DS1 could be transmitted to the first signal transmission line 30 and the second signal transmission line 40, respectively. The connector C1 can also be electrically connected to the microcontroller 60 through a two-line type serial bus circuit B1. In one implementation, the connector C1 may be a LC/PC connector, a LC/UPC connector, or an MPO connector among others. The microcontroller 60 can be connected with the whole system module so that the optical transmission control device 3 might operate using the connector C1. The first light emitting sub-component 10 and the second light emitting sub-component 20 can be connected to the optical connector OC1 through an optical fiber. The optical connector OC1 may be, for example, an LC/PC connector or an LC/UPC connector.

The optical receiving control circuit includes a first light receiving sub-component 80, a second light receiving sub-component 90, a microcontroller 100, an amplifier 130, a voltage converter 140, a connector C2, and an optical connector OC2. The light receiving sub-component 80, the second light receiving sub-component 90, the microcontroller 100, the amplifier 130, and the voltage converter 140 might be disposed on a printed circuit board PCB2. The configuration and function of the light receiving sub-component 80, the second light receiving sub-component 90, the microcontroller 100, the amplifier 130, and the voltage converter 140 might be similar to the embodiment illustrated in FIG. 2. The connector C2 is electrically connected to the first signal transmission line 110 and the second signal transmission line 120 illustrated in FIG. 2 so that it can receive the analog signal AS1 and the digital signal DS1 from the first signal transmission line 110 and the second signal transmission line 120, respectively. The connector C2 may also be connected to the microcontroller 100 through the two-line type serial bus circuit B1. The connector C2 may be selected from a LC/PC connector, a LC/UPC connector, and an MPO connector, among others. The microcontroller 100 can be connected to the entire system module so that the optical transmission control device 3 might operate using the connector C2. The first light receiving sub-component 80 and the second light receiving sub-component 90 can be connected to the optical connector OC2 through an optical network fiber. The optical connector OC2 may be, for example, an LC/PC connector or an LC/UPC connector. The light emitting control circuit located at the transmission terminal TX can transmit the analog signal AS1 and the digital signal DS1 to the light receiving control circuit located at the receiving terminal RX through the optical connector OC1. And optical connectors OC1 and OC2 might be connected using another network fiber also.

The light emitting control circuit and the light receiving control circuit of the optical transmission control device illustrated in FIG. 3 can be a circuit in the optical receiving and transmitting module disposed on the tower (outdoor), or a circuit in the optical receiving and transmitting module disposed under the tower (indoor), or circuits in the optical receiving and transmitting modules disposed on and under the tower, respectively. The optical transmission control device 3 illustrated in FIG. 3 can be applied to the optical receiving and transmitting module with multiple transmitting and receiving components (e.g. 2T2R, 3T3R, 4T4R, 8T8R etc.). In addition, since the light emitting/receiving control circuit can integrate the analog signal channel and the digital signal channel into one printed circuit board PCB1/PCB2, and can transmit and receive the analog signal AS1 and the digital signal DS1 simultaneously, the size of the optical transmission control device may be smaller, the power consumption may be reduced, and the complexity of network configuration may be lowered.

In view of the above description, the optical transmission control device of the present disclosure may transmit the digital signal and the analog signal simultaneously with the integrated transmission channel of digital signal and analog signal, thereby providing an optical transmission control device with low power consumption, small size, and simple organization.

Although the present invention is disclosed in the foregoing embodiments, it is not intended to limit the present invention. Changes and modifications made without departing from the spirit and scope of the present invention belong to the scope of patent protection of the present invention. For the scope defined by the present invention, please refer to the attached claims.

What is claimed is:

1. An optical transmission control device, comprising:
   a first light emitting sub-component;
   a second light emitting sub-component;
   a first signal transmission line connected to the first light emitting sub-component and configured to receive an analog signal;
   a second signal transmission line configured to receive a digital signal;
   a laser driving component connected to the first light emitting sub-component, the second light emitting sub-component, and the second signal transmission line; and
   a microcontroller connected to the laser driving component and configured to receive a data signal, control the laser driving component to generate and output a driving signal to at least one of the first light emitting sub-component and the second light emitting sub-component according to the data signal, and control the laser driving component to process and output the digital signal to the second light emitting sub-component according to the data signal.

2. The optical transmission control device of claim 1, wherein the laser driving component comprises:
   a first laser driver connected to the first light emitting sub-component and the microcontroller; and
   a second laser driver connected to the second signal transmission line, the microcontroller, and the second light emitting sub-component, and configured to be controlled by the microcontroller to process the digital signal,
   wherein the data signal comprises at least one of an analog command and a digital command, the microcontroller is configured to control the first laser driver to generate and output the driving signal to the first light emitting sub-component according to the analog command and control the second laser driver to generate and output the driving signal to the second light emitting sub-component according to the digital command.

3. The optical transmission control device of claim 1, wherein the microcontroller is a first microcontroller and the optical transmission control device further comprises:
   a first light receiving sub-component configured to receive the analog signal;
   a second light receiving sub-component configured to receive the digital signal; and
   a second microcontroller connected to the first light receiving sub-component and the second light receiving sub-component, and configured to monitor respective input power of the first light receiving sub-component and the second light receiving sub-component.

4. The optical transmission control device of claim 3, further comprising a voltage converter connected to the first light receiving sub-component and the second light receiving sub-component and supplying power to the first light receiving sub-component and the second light receiving sub-component.

5. The optical transmission control device of claim 3, further comprising an amplifier connected to the second light receiving sub-component and configured to amplify the digital signal.

6. An optical transmission control device, comprising:
   a first light receiving sub-component configured to receive an analog signal;
   a second light receiving sub-component configured to receive a digital signal;
   a microcontroller connected to the first light receiving sub-component and the second light receiving sub-component;
   a first signal transmission line connected to the first light receiving sub-component and configured to output the analog signal; and
   a second signal transmission line connected to the second light receiving sub-component and configured to output the digital signal.

7. The optical transmission control device of claim 6, further comprising a voltage converter connected to the first light receiving sub-component and the second light receiving sub-component and supplying power to the first light receiving sub-component and the second light receiving sub-component.

8. The optical transmission control device of claim 6, further comprising an amplifier connected to the second light receiving sub-component and configured to amplify the digital signal.

* * * * *